INVENTOR.
ROBERT C. DEW
BY Arthur F. Robert
ATTORNEY

INVENTOR.
ROBERT C. DEW

United States Patent Office 3,454,223
Patented July 8, 1969

3,454,223
RADIANTLY-HEATED POULTRY BROODER
Robert C. Dew, New Albany, Ind., assignor to Stratton & Terstegge Company, Louisville, Ky., a corporation of Kentucky
Filed Feb. 23, 1968, Ser. No. 707,742
Int. Cl. A01k 41/02; F24h 3/02
U.S. Cl. 237—14     2 Claims

ABSTRACT OF THE DISCLOSURE

The suction side of a blower causes high temperature flue-gas, produced by burning a fuel and air mixture in the combustion chamber of a furnace, to flow from that combustion chamber through the going and return runs of a long heat-radiating radiator, which radiates heat into an elongated poultry hover space, while the pressure side of that blower forces the spent flue-gas from the radiator to flow successively through a preheater, which places that spent flue-gas in heat exchange relationship with the shell of the combustion chamber (for the purpose of cooling that shell while preheating the spent gas), and a distributor, which divides the flue-gas into two substantial parts and which exhausts one part into the room while directing the other part back into the combustion chamber where it mixes and flows with the incoming streams of fresh air and fuel.

BACKGROUND OF THE INVENTION

Field of the invention

The present invention relates to a radiantly-heated poultry brooder of the long forced-flow type.

Description of the prior art

Prior radiantly-heated poultry brooders may be broadly classified as comprising either: a short open-flue gravity-flow type wherein flue-gas heat is "radiated" into the floor of an upwardly-open or completely-closed small brooder space; or an elongate closed-circuit warm-air forced-flow type wherein hot-air heat is radiated downwardly into the floor of an elongate hover space, which, usually, is from 25 to 150' long and which has an open access slot between the floor and one or more nearby margins of an overlying shed or hover.

Radiantly-heated poultry brooders of the short open-flue gravity-flow type are proposed in old U.S. Patents #803,140, #1,018,714 and #1,349,175. Those of the elongate closed-circuit warm-air forced flow type are proposed in more recent U.S. patents, such as #2,560,246 and #2,870,966.

In these latter patents, the suction side of a blower causes heated air to flow from the heating chamber of a warm air furnace through the going and return runs of an elongate radiator (which radiates heat into an elongate hover space) while the pressure side of the blower forces the spent warm air coming from the radiator to flow through the heating compartment of the furnace back into the going run of the radiator. Both arrangements use radiant heat, rather than conducted or convected heat, to obtain a draft-free hover space having a floor temperature of about 90° and a lower ambient room temperature. So far as we know, these have not been sufficiently effective either to appear on the market or, if marketed, to make any noticeable impact thereon.

SUMMARY OF THE INVENTION

Objects of the invention

The principal objects of the present invention are: to provide a simply constructed radiantly-heated poultry brooder of the elongate endless-circuit forced-flow type; to provide one, which is effective and efficient in operation; and to provide one characterized by a draft-free hover space having a more uniform floor temperature along its length than has heretofore been obtained.

Statement of the invention

Substantially all of the foregoing objects are achieved in the preferred form of the present invention which comprises: A. a furnace having, between cold and hot ends, a combination chamber capable of producing, as a source of radiant heat, a flue-gas heated to a temperature in the range of about 400° F. to about 900° F. or more; B. a hover of the type having (1) a horizontally-elongate downwardly-open inverted V-roof, (a) which has furnace and remote ends, (b) which extends longitudinally away from the furnace with its furnace end adjacent the furnace, and (c) which normally cooperates with the underlying floor to form an elongate hover space therebetween with access slots along the floor margins of that space; and (2) a horizontally-elongate radiant-heat radiator having corresponding furnace and remote ends and being (a) positioned under said roof to extend longitudinally through the apex portion of its hover space, and (b) composed of horizontally elongate concentrically-spaced inner and outer pipes forming a continuous heat-radiating conduit having a going run extending from the furnace end of the radiator outwardly through the core space provided by the inner pipe to the remote end of the radiator and a return run extending from the remote end of the radiator inwardly through the surrounding shell space (cooperatively provided between the inner and outer pipes) back to the furnace end of the radiator; C. a gas preheater arranged in heat exchange relationship with the furnace for gas-preheating and furnace-cooling purposes; D. a blower for endlessly circulating flue-gas by suctioning the flue-gas from the furnace through the radiator and then forcing spent flue-gas from the radiator through the preheater back into the furnace; and E. a bleeder connected to the gas circuit between the radiator and the cold end of the furnace for flue-gas venting purposes.

The preferred form of my invention is not only simply constructed but effective and efficient in operation since it radiates flue-gas heat directly and uniformly into the hover space and since it places the spent flue-gas into heat exchange relationship with the combustion chamber of the furnace so as to cool that furnace while contemporaneously preheating the spent flue-gas for both room heating proposes and recycling purposes. More importantly, it provides a highly uniform floor temperature along the length of the hover because, while the quantity of heat radiated by the flue-gas in each pipe of the radiator progressively decreases in the direction of flow, the total quantity of heat radiated into the floor at the furnace end of the hover is not appreciably different from the total quantity of heat radiated into the floor either at the remote end of the hover or at any point along the length of the hover.

BRIEF DESCRIPTION OF THE DRAWINGS

The presently preferred embodiment of the invention is disclosed in the drawings wherein.

DESCRIPTION OF THE PREFERRED EMBODIMENT

Figure 1:
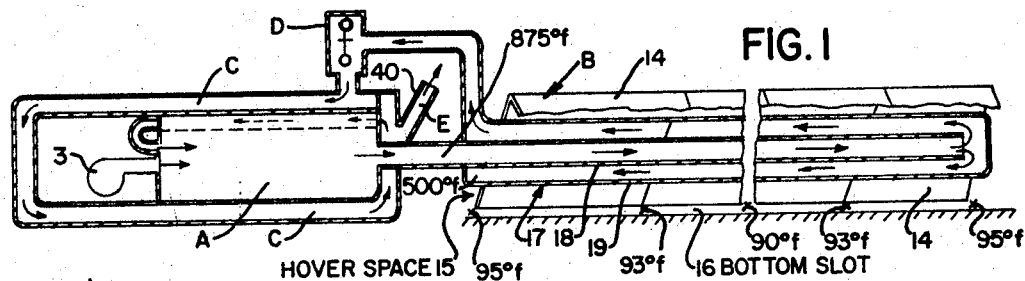
FIG. 1 is a schematic view of said embodiment showing the path along which all of the flue-gases flow, the recycling path by which one substantial portion of the flue-gases are recycled through the furnace and the bleeder path along which the remaining portion of the flue-gases are vented to atmosphere.
Figure 2:
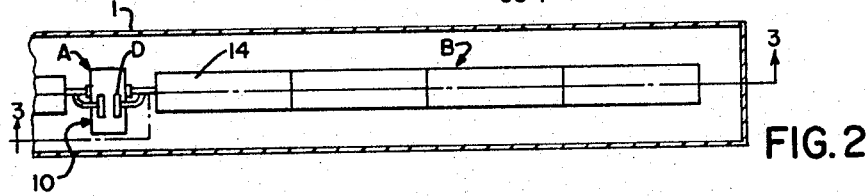
FIG. 2 is a partly broken top plan view of a brooder house containing the brooding apparatus of FIG. 1.
Figures 3, 4:
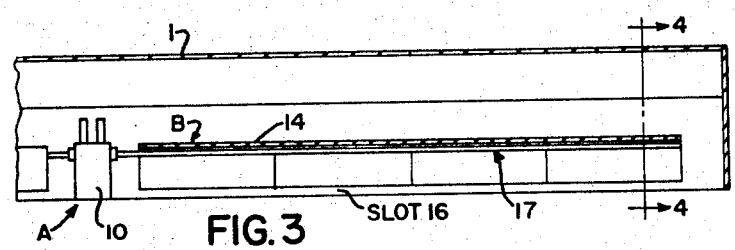
FIG. 3 is a side elevational view taken along line 3—3 of FIG. 2.
FIG. 4 is a section taken along 4—4 of FIG. 3.
Figures 5, 6:
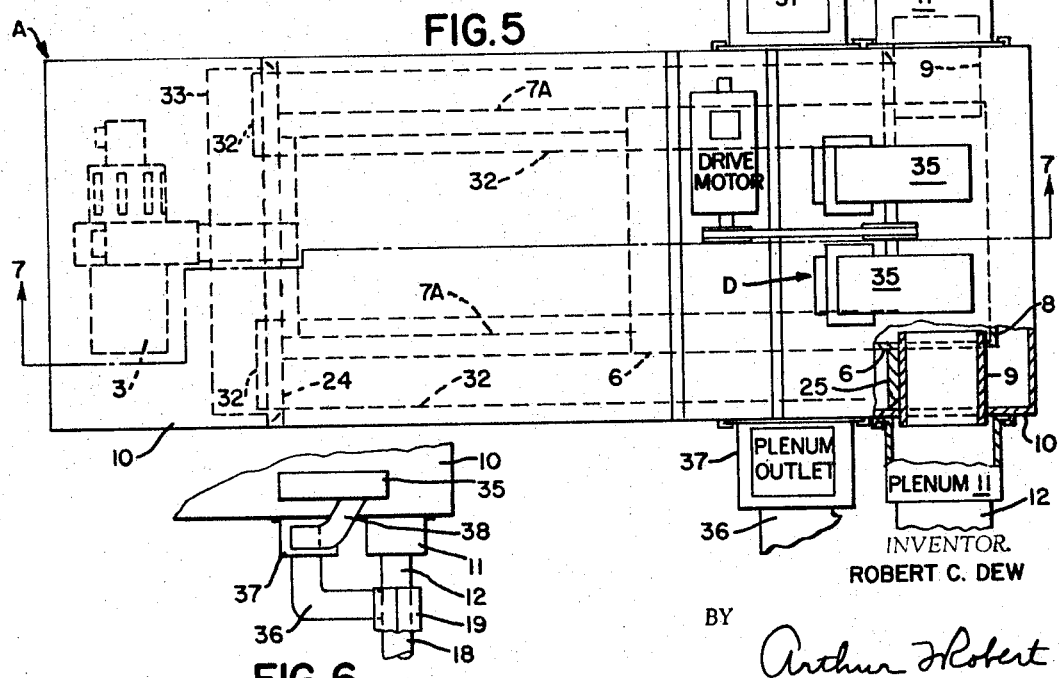
FIG. 5 is a partly broken top plan view of the central heating plant of FIGS. 1-3, this view omitting the connections between each blower inlet and its spent flue-gas plenum.
FIG. 6 is a fragmentary top plan view of the outgoing connection between one "hot" flue-gas plenum and the adjacent radiator and of the incoming connection between the corresponding "spent" flue-gas plenum and its blower inlet.
Figure 7:
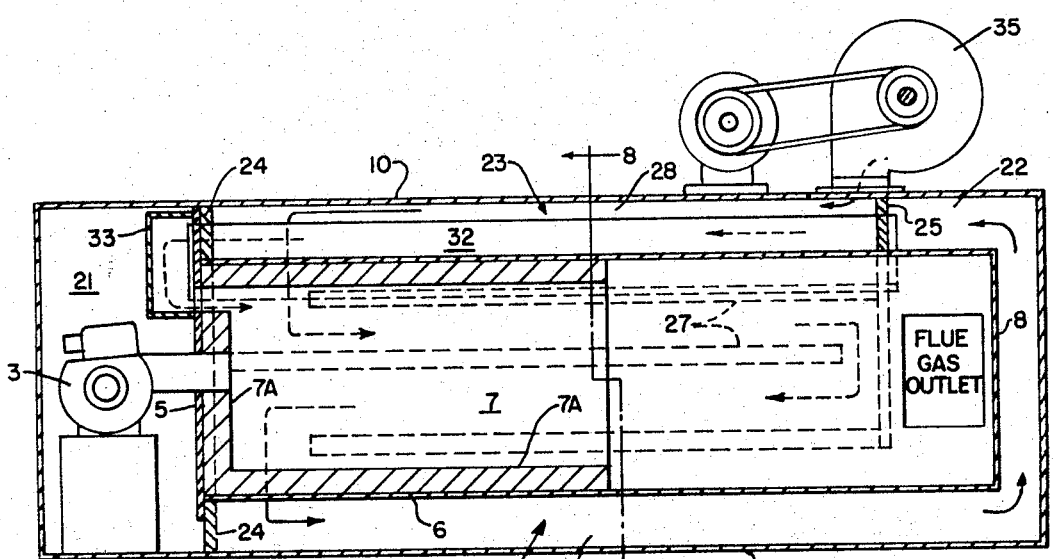
FIG. 7 is a section taken along line 7—7 of FIG. 5.

The preferred embodiment, as seen in FIG. 1, broadly comprises 5 elements as follows: A. a furnace; B. a hover; C. a preheater; D. a blower; and E. a vent or bleeder. As seen in FIGS. 2-4, the brooder is conventionally contained within a poultry brooder house 1.

More particularly, the preferred embodiment accommodates the flow of flue-gas from a central furnace A into a right flue-gas system composed of elements B through E and a left flue-gas system identically composed of the same elements. Accordingly, we shall describe only one system with particularity.

Element A.—Furnace

The furnace A comprises a fuel pump 3 for causing a stream of air and liquid fuel to flow through an inlet opening 4, which is centrally-arranged in a header 5 at the "cold"-end of an inner cylindrical shell 6. This inner shell 6 provides a combustion chamber 7 between its cold-end header 5 and a header 8 closing its opposite "hot"-end.

The combustion chamber 7 has a fire pot 7A within which the main burning action takes place. Flue-gases from the hot end of the combustion chamber 7 are discharged into the right flue-gas system through an outlet duct 9 in the right side of the inner shell adjacent its hot-end header 8.

The fuel pump 3 and the inner shell 6 of the furnace are housed within an outer shell 10. The right side of the outlet duct 9 extends from the inner shell 6 to (or through) a suitable opening in the outer shell 10 where it discharges into a right side plenum 11 which is slidably mounted on the outer shell for vertical movement over a range sufficient to accommodate changes in the elevation of the hover as will be subsequently explained. The flue-gas in the movable plenum 11 discharges through a short pipe connection 12 leading from the right plenum 11 into the adjacent end (or furnace end) of the hover element B.

The furnace also discharges flue-gas for the left system through a left-side outlet duct 9, left-side plenum 11 and a short pipe 12 leading to the left hover B.

Element B.—The hover

The hovers B of both systems are identical. The hover B of the right system comprises: (1) a horizontally elongate roof 14 of the downwardly-open inverted-V type (a) having an adjacent furnace end and a remote end, (b) extending longitudinally away from the furnace with its furnace end preferably closely adjacent the furnace, and (c) cooperating with the underlying floor to form an elongate hover space 15 having one or more poultry access slots 16 along the floor margins of that space; and (2) a horizontally elongate heat-radiating radiator 17 which has corresponding furnace and remote ends. The radiator 17 is positioned under the roof 14 to extend longitudinally through the apex portion of hover space 15 substantially throughout the length of the roof. It is composed of horizontally-elongate concentrically-spaced inner and outer pipes 18 and 19 cooperatively forming the going and return runs of a continuous heat-radiating conduit wherein the going run extends from the furnace end of the hover outwardly to the remote end thereof through the core space provided by the inner pipe 18 while the return run extends from the remote end of the hover inwardly to the furnace end thereof through the surrounding shell space cooperatively provided by and between the inner pipe 18 and the outer pipe 19. Pipe 12 of the furnace connects plenum 11 with the inner pipe 18 of the radiator.

The roof 14 may be supported in any suitable way (not shown). Preferably it is divided into separate (25 ft.) sections which, preferably, may be jointly raised from their lowest operative position to any position, in a range of higher positions, to accommodate the growth of chicks in the hover and to provide a desired degree of access to the floor of the hover space 15 for cleaning purposes. When operatively positioned, the roof 14 has its bottom edges suitably spaced above the floor level to provide said access slots 16, which, preferably extend along the full length of the hover on each side and along its remote end at least. These poultry access slots may be varied from about 4" high to 12" more or less. The radiator 17 is supported by the overlying roof 14 so that the entire hover of the right system may be moved vertically as a unit by a single right-side hoist, not shown.

Element C.—Preheater

The gas preheater C of the right system is arranged in heat exchange relationship with the inner shell 6 of the furnace for gas preheating and furnace-cooling purposes.

The outer housing or shell 10, which is rectangular in cross-section, completely encloses the inner shell 6. The outer shell 10 is larger than the inner shell 6 and cooperates with it to provide two end chambers and an interposed preheating chamber as follows: (1) an open chamber 21 at the cold-end of the furnace between the cold-end of the inner shell 6 and the adjacent louvered end of the outer housing 10; (2) a closed chamber 22 at the hot-end of the furnace between the hot-end of the inner shell 6 and the coresponding closed end of the outer housing 10, this closed or hot-end chamber 22 also extends between a small peripheral end portion of the inner shell 6 and a corresponding portion of the outer housing: and (3) a cylindrical shell-like chamber 23 extending ing the shell-like space between the peripheral walls of the inner shell 6 and outer shell 10 from the cold-end chamber 21 to the hot-end chamber 22.

The cylindrical shell-like chamber 23, which constitutes the preheating chamber, is separated from the cold-end chamber 21 by radially extending the cold-end header 5 outwardly to the walls of the outer housing 10 as indicated at 24. Likewise, the hot-end chamber 22 is separated from the cylindrical chamber 23 by a disc-type of ring baffle 25 surrounding the upper half and part of the lower half of the inner shell 6 in a vertical plane near (but spaced from) its hot-end header 8, this disc ring baffle 25 extending radially outward to the walls of the housing 10.

Figure 8:
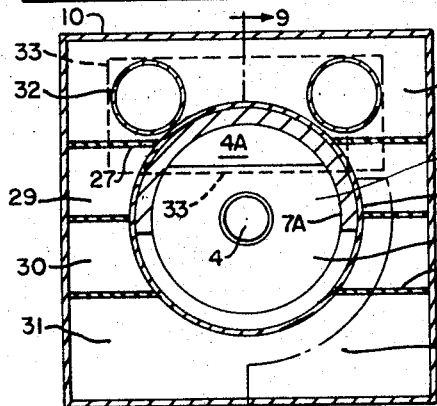
FIG. 8 is a section taken along line 8—8 of FIG. 7.
Figure 9:
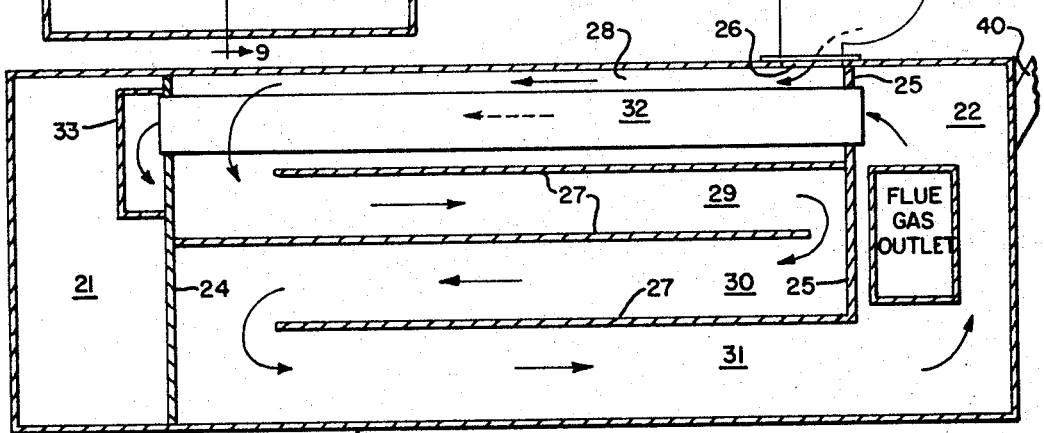
FIG. 9 is a developed sectional view corresponding to a section taken along line 9—9 of FIG. 8.

The cylindrical shell-like preheating chamber 23 is provided at its hot-end with a pair of right and left spent-flue-gas inlets 26 (see FIG. 8) formed in the top wall of the outer housing 10. The right vertical half of preheating chamber 23, between its cold and hot-ends 24 and 25, is divided by a zig-zag series of three horizontally-extending vertically-spaced baffles 27 into an elongate zig-zag conduit, comprising four horizontal sections, viz: (1) a top section 28 extending from top inlet 26 adjacent the hot disc-like ring baffle 25 horizontally along the upper side of upper baffle 27 to the cold-end of the inner shell where it communicates downwardly through the opening between the end of upper baffle 27 and the cold end header extension 24; an intermediate upper section 29 extending from cold-end header extension 24 horizontally between the top and center baffles 27 toward the hot-end of the inner shell 6 near which section 29 communicates downwardly between that end of the center baffle 27 and the adjacent hot-end baffle 25; an intermediate lower section 30 extending from the hot-end baffle 25 horizontally between the center and lower baffles 27 to the extension 24 of cold-end header 5 where it communicates downwardly through an opening between lower baffle 27 and extension 24; and a bottom section 31 extending from the cold-end header extension 24 horizontally under the lower baffle 27.

The preheater C for the right system additionally includes: the hot-end chamber 22 into which the bottom section 31 of the zig-zag conduit discharges; a recycling pipe 32 extending from the hot-end chamber 22 successively through the hot-end disc-ring baffle 25, the top section 28 of the preheater C and the cold-end header 5; and a recycling header 33 located within the cold-end chamber 21 to direct the spent flue-gas discharging from pipe 32 back through cold-end header 5 into combustion chamber 7 where it mixes with the incoming air and fuel.

In the preheater C for the left system, the left vertical half of preheating chamber 23 is similarly divided by another series of baffles 27 into an elongate zig-zag conduit composed of sections 28–31, it being understood that top and bottom sections 28 and 31 are common to both systems but intermediate sections 29 and 30 in the left system are separated from intermediate sections 29 and 30 in the right system by the interposed shell 6.

The left system shares hot-end chamber 22 with the right system but has its own recycling pipe 32 and header 33 for returning the preheated spent flue-gas to the combustion chamber 7.

*Element D.—Blower*

The blower D, which is provided to force the flue-gas to circulate through both systems includes a right blower 35 interposed between the right hover B and the right preheater C. This blower preferably is mounted on the top of the outer shell 10 closely adjacent the plenums 11 and 37. It has its suction inlet connected to the furnace end of the outer pipe 19 of radiator 17 through a succession of parts comprising: a short discharge elbow 36 connecting outer pipe 19 to a spent flue-gas plenum 37 which is slidably mounted on outer shell 10 in side-by-side relationship with plenum 11; and another short elbow 38 connecting plenum 37 to the inlet of blower 35. The outlet of blower 35 is connected directly to the flue-gas inlet 26 of the right preheater C so that it discharges into the top section 28 of the preheater's zig-zag conduit.

The spent gas-outlet pipe 19 of the left system radiator 17 is connected through identical parts 36–38 to the inlet end of the left blower 35. The outlet end of the left blower discharges spent gas into the flue-gas inlet 26 of the left preheater C.

*Element E.—Vent or bleeder*

It is desirable to bleed flue-gas from the pressure side of the system either at the beginning or the end of the preheating operation. As shown, this may be conveniently done at the end of that operation by exhausting flue-gas from the hot-end chamber 22 of the right preheater through an exhaust duct 40. Either a common exhaust duct 40 may be employed or one or more exhaust ducts may be provided for each system.

OPERATION

In operation, the suction of the blowers 35 should create a negative pressure in the combustion chamber 7. The air and fuel mixture flowing into this chamber burns mainly within the fire pot 7A. One half of all of the resulting flue-gases flow from the furnace combustion chamber through the right system, the other half through the left system. In each system, the flue-gases flow successively through these passageways or parts, viz: furnace discharge parts 8–12; pipes 18–19 of radiator 17; blower parts 35–38; and preheater chamber conduits 28–31 to the hot-end chamber 22. In each system, some of the spent flue-gas continues from chamber 22 through recycling parts 32–33 back into combustion chamber 4, the remainder being vented or bled off from chamber 22 through exhaust opening 40 either into the housing as indicated or elsewhere as desired. While the ratio of newly generated flue-gas to recycled flue-gas may vary, I have obtained excellent results with a 1–1 ratio; hence, bleed off approximately 50% of the spent flue-gas.

My arrangement has a number of advantages. By using the flue-gas as a direct radiant energy source in the hover and by minimizing the length of the flue-gas connection between the combustion chamber 7 and the inlet end of the inner radiator pipe 18, my arrangement efficiently provides the radiator inlet with the highest possible temperature obtainable from the combustion chamber. This is important because the quantity of heat radiated into the floor at the furnace end of the hover increases rapidly as the temperature of the incoming heat-radiating flue-gas increases. More particularly, this increase in the quantity of heat radiated is somewhat proportional to the 4th power of the increase in temperature.

Furthermore, the use of a radiator of the concentric-pipe type illustrated provides a fairly uniform floor temperature. For example, with a 4″ access slot 16 and with incoming and outgoing gas temperatures of 875° F. and 500° F. at the furnace end of the hover, I have obtained, in a hover 100′ long, floor temperatures (a) of 95° F. at both (furnace and remote) ends of the hover, (b) of 93° at 25′ and 75′ from the furnace end of the hover and (c) of 90° at the center of the hover. Due to convection, these temperatures level over under equilibrium conditions with the result that, under the aforesaid conditions, a pairly uniform temperature in the range of 90 to 95° F. is ultimately secured along the floor across the width of the hover from one end of its length to the other.

Under the foregoing operating conditions, the hover will subject day-old chicks to a draft-free temperature approximating 95°, which is required to maintain the chicks in a healthy condition. Seven to ten (7–10) days later, the hover should be raised sufficiently to increase the access slot from 4″ to about 8″. This will reduce the temperature within the hover, which is desirable, and allow heat to escape into the somewhat colder brooder house normally increasing its room temperature somewhat. When the chicks are about 3 full weeks old, the hover is again raised to increase the access slot from 8″ to 12″, reduce the hover temperature still further and increase the booder house room temperature. Usually, the hover stays at its 12″ slot position for the 3 week to 9 week period at which time the chicks are marketed. Thereupon, the brooder house may be cleaned and the hover lowered to its 4″ slot height to prepare it for the next batch of chicks.

Having described my invention, I claim:

1. A radiantly-heated poultry brooder of the elongate forced-flow type comprising:
   (A) an elongate poultry having inlet-outlet and remote end portions and being composed of
      (1) an elongate inverted V-roof
         (a) having corresponding end portions and
         (b) being normally spaced above the brooder floor with a hover access slot along said said floor, and
      (2) an elongate radiant-heat tubular radiator located adjacent the underside of the apex of the roof to extend substantially from the inlet-outlet end of the roof to the remote end thereof, said radiator being composed of
         (a) an inner pipe having inlet and remote ends, (b) a concentric outer pipe having remote and outlet ends, and (c) means constraining the remote end of the inner pipe to discharge into the remote end of the outer pipe;

(B) a furnace shell having a cold fuel-receiving end portion, a hot-end portion located adjacent the inlet-outlet end portion of said hover and connected to the inlet end of the inner pipe and, between said cold and hot-end portions, a combustion chamber capable of burning fuel to generate flue-gas at a temperature high enough for the hot-end of said furnace to deliver flue-gas to the inlet end of said inner pipe at a temperature in a range of about 400° F. to about 900° F.;

(C) a blower having its inlet connected to the outlet end of the outer pipe to suction flue-gas from the furnace successively through the inner pipe and the outer pipe; and (D) means connected to receive spent flue-gas from the blower outlet and discharge one part of it into the cold-end of the furnace and another part through a discharge vent.

2. The brooder of claim 1 wherein:

(A) said spent-gas receiving means includes:

(1) a spent-gas preheater in heat-exchange relationship with said furnace shell.

References Cited

UNITED STATES PATENTS

| | | | |
|---|---|---|---|
| 2,938,449 | 5/1960 | Newell et al. | 98—40 |
| 3,206,121 | 9/1965 | Bentley | 237—15 |

EDWARD J. MICHAEL, *Primary Examiner.*

U. S. Cl. X.R.

126—110

UNITED STATES PATENT OFFICE
CERTIFICATE OF CORRECTION

Patent No. 3,454,223                 July 8, 1969

Robert C. Dew

It is certified that error appears in the above identified patent and that said Letters Patent are hereby corrected as shown below:

Column 2, line 11, change "combination" to -- combustion --; line 50, change "proposes" to -- purposes --. Column 4, line 48, change "ing the" to -- in the --. Column 6, line 36, change "over" to -- off --; line 38, change "pairly" to -- fairly --; line 53, change "booder" to -- brooder --; line 62, (3rd line of claim 1) after "poultry" insert -- hover --.

Signed and sealed this 4th day of November 1969.

(SEAL)
Attest:

Edward M. Fletcher, Jr.                WILLIAM E. SCHUYLER, JR.
Attesting Officer                        Commissioner of Patents